(12) United States Patent
Thomas et al.

(10) Patent No.: US 7,047,274 B2
(45) Date of Patent: May 16, 2006

(54) VIRTUAL MODULAR RELAY DEVICE

(75) Inventors: Robert P. Thomas, Ellington, CT (US); James Petrizzi, Tariffville, CT (US); Patrick Meagher, Cromwell, CT (US); Sunil Mathur, Guilderland, NY (US); Rajaiah Karanam, Bristol, CT (US); Geoff Butland, Farmington, CT (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 10/195,866

(22) Filed: Jul. 15, 2002

(65) Prior Publication Data

US 2003/0061335 A1    Mar. 27, 2003

Related U.S. Application Data (63) Continuation of application No. 09/397,395, filed on Sep. 16, 1999, now abandoned.

(51) Int. Cl.
*G06F 15/16* (2006.01)
(52) U.S. Cl. .................................. 709/200; 700/83
(58) Field of Classification Search ............. 709/223, 709/243; 700/83, 295; 702/61; 717/105, 717/109, 113, 125, 762, 763
See application file for complete search history.

(56) References Cited

U.S. PATENT DOCUMENTS

| | | | |
|---|---|---|---|
| 4,491,793 A | 1/1985 | Germer et al. | 324/157 |
| 4,598,248 A | 7/1986 | Germer | 324/103 |
| 4,620,150 A | 10/1986 | Germer et al. | 324/103 |
| 4,754,217 A | 6/1988 | Germer et al. | 324/116 |
| 5,317,546 A | 5/1994 | Balch et al. | 368/9 |
| 5,603,040 A | 2/1997 | Frager et al. | 395/750 |
| 5,696,501 A | 12/1997 | Ouellette et al. | 340/870.02 |
| 5,764,155 A | 6/1998 | Kertesz et al. | 340/825.08 |

(Continued)

OTHER PUBLICATIONS

"PowerSys Add-In Module V1.00 for Microsoft Excel V5.0—User's Guide"; Power Measurement, Ltd.; pp. 1-54; Jan. 31, 1995.

(Continued)

*Primary Examiner*—Andrew Caldwell
*Assistant Examiner*—Stephan Willett
(74) *Attorney, Agent, or Firm*—Cantor Colburn LLP (57) ABSTRACT

A computerized power management control system (10) includes a virtual modular relay device (82) for providing input and output data to and from a corresponding, actual modular relay device (47 or 49). Virtual modular relay device (82) is displayed in a window (90), with the upper left-hand corner of window (90) including a graphical depiction (92) of the modular relay device. Immediately below the graphical depiction (92) is a communications status indicator (94), which shows the status of communications (connected/disconnected) between the virtual device (82) and an inter-process communications server (52). Various fields (96) appear along the left-hand side of window to identify the modular relay unit (47 or 49). Below identification fields (96) are a plurality of buttons (98), each of which allow the user to activate a program module. Buttons (156 and 154) can be customized by the user to activate any program module. Tabbed pages (102) allow the user to quickly view numerous functions without cluttering the computer screen. The functions depicted on each of the tabbed pages (102) are user-defined. A program utility automatically configures the virtual modular relay device (82) graphic and links the virtual intelligent electronic device (82) to its actual counterpart (47 or 49) so that input and output signals may be sent between the two.

12 Claims, 7 Drawing Sheets

U.S. PATENT DOCUMENTS

| | | | |
|---|---|---|---|
| 5,768,148 A | 6/1998 | Murphy et al. | 364/492 |
| 5,794,144 A | 8/1998 | Comer et al. | 455/426 |
| 5,850,187 A | 12/1998 | Carrender et al. | 340/825.54 |
| 5,861,742 A | 1/1999 | Miller et al. | 324/156 |
| 5,862,391 A | 1/1999 | Salas et al. | 395/750.01 |
| 5,867,688 A | 2/1999 | Simmon et al. | 395/500 |
| 5,898,904 A | 4/1999 | Wang | 455/31.3 |
| 5,905,882 A | 5/1999 | Sakagami et al. | 395/500 |
| 5,905,908 A | 5/1999 | Wagner | 395/831 |
| 5,909,183 A | 6/1999 | Borgstahl et al. | 340/825.22 |
| 5,930,771 A | 7/1999 | Stapp | 705/28 |
| 5,933,092 A | 8/1999 | Ouellette et al. | 340/870.02 |
| 5,949,773 A | 9/1999 | Bhalla et al. | 370/331 |
| 5,949,779 A | 9/1999 | Mostafa et al. | 370/389 |
| 5,956,487 A | 9/1999 | Venkatraman et al. | 395/200.48 |
| 5,959,536 A | 9/1999 | Chambers et al. | 340/636 |
| 6,003,070 A | 12/1999 | Frantz | 709/206 |
| 6,021,324 A | 2/2000 | Sizer, II et al. | 455/403 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,750 A | 4/2000 | Lea | 710/72 |
| 6,057,758 A | 5/2000 | Dempsey et al. | 340/539 |
| 6,072,521 A | 6/2000 | Harrison et al. | 348/12 |
| 6,239,960 B1* | 5/2001 | Martin | 361/86 |
| 6,243,662 B1* | 6/2001 | Hashimoto | 702/187 |
| 6,349,341 B1* | 2/2002 | Likes | 709/249 |
| 6,380,949 B1* | 4/2002 | Thomas et al. | 715/705 |
| 6,701,462 B1* | 3/2004 | Majcher et al. | 714/43 |
| 6,751,562 B1* | 6/2004 | Blackett et al. | 702/61 |
| 6,792,337 B1* | 9/2004 | Blackett et al. | 700/295 |
| 6,845,401 B1* | 1/2005 | Papadopoulos et al. | 709/250 |
| 6,853,867 B1* | 2/2005 | Klindt et al. | 700/83 |
| 2003/0061335 A1* | 3/2003 | Thomas et al. | 709/223 |

OTHER PUBLICATIONS

"PEGASYS Installation and Configuration Guide"; Power Measurement, Ltd.; pp. 1-31 ; Oct. 1, 1994.
"PEGASYS User Interface—User's Guide"; Power Measurement, Ltd.; pp. 1-73; Oct. 1, 1994.
"PEGASYS for Windows NT, Version 1.1—User's Guide"; Power Measurement, Ltd.; pp. 1-1 thru 6-12; 1995.
"POWESYS—Version 1.00 for Windows—User's Guide"; Power Measurement, Ltd.; pp. 1-40; Jan. 31, 1995.
Complaint and Jury Demand; CV-02-0058R; Power Measurement, Inc. and Power Measurement Ltd. vs. General Electric Company; 28 Pgs.; Jan. 7, 2002.
Answer, Affirmative Defenses, and Counterclaims of General Electric Company, Jury Demand; CV-02-0058R; Power Measurement, Inc. and Power Measurement Ltd. vs. General Electric Company; 17 Pgs.; Mar. 7, 2002.
Stipulation; CV-02-0058R; Power Measurement, Inc. and Power Measurement Ltd. vs. General Electric Company; 2 Pgs.; Mar. 28, 2002.
First Amended Complaint and Jury Demand; 3:02-CV-771 (AWT); Power Measurement, Inc. and Power Measurement Ltd. vs. General Electric Company; 28 Pgs.; Jun. 10, 2002.
General Electric's Answer, Affirmative Defenses and Counterclaims to Plaintiffs' First Amended Complaint; 3:02-CV-771 (AWT); Power Measurement, Inc. and Power Measurement Ltd. vs. General Electric Company; 18 Pgs.; Jul. 3, 2002.
Stipulation for Dismissal With Prejudice; 3:02-CV-771 (AWT); Power Measurement, Inc. and Power Measurement Ltd. vs. General Electric Company; 5 Pgs.; Aug. 12, 2002.
Judgement on Consent; 3:02-CV-771 (AWT); Power Measurement, Inc. and Power Measurement Ltd. vs. General Electric Company; 5 Pgs.; Aug. 12, 2002.
Complaint; 3:02-CV-78 (AWT); General Electric Company vs. Power Measurement, Inc. and Power Measurement Ltd.; 25 Pgs.; Jan. 14, 2002.
Answer, Affirmative Defenses and Counterclaims; 3:02-CV-78 (AWT); General Electric Company vs. Power Measurement, Inc. and Power Measurement Ltd.; 30 Pgs.; Apr. 2, 2002.
General Electric's Answer and Affirmative Defenses to Defendants' Counterclaims; 3:02-CV-78 (AWT); General Electric Company vs. Power Measurement, Inc. and Power Measurement Ltd.; 10 Pgs.; Apr. 22, 2003.
Judgement on Consent; 3:02-CV-78 (AWT); General Electric Company vs. Power Measurement, Inc. and Power Measurement Ltd.; 4 Pgs.; Aug. 7, 2002.
Stipulation for Dismissal With Prejudice; 3:02-CV-78 (AWT); General Electric Company vs. Power Measurement, Inc. and Power Measurement Ltd.; 3 Pgs.; Aug. 12, 2002.
"PEGASYS Preliminary User Interface, User's Guide", Version 1.0 BETA for Windows NT, Power Measurement Ltd., pp. 1-73, Oct. 1, 1994.
"PEGASYS Preliminary Installation and Configuration Guide", Version 1.0 BETA for Windows NT, Power Measurement Ltd., pp. 1-31, Oct. 1, 1994.
"PEGASYS User's Guide", Version 1.1 for Windows NT, Power Measurement Ltd., Mar. 31, 1995.
"PowerSys User's Guide", Version 1.00 for Windows, Power Measurement Ltd., Pgs. 1-41, Jan. 31, 1995.
"PowerSys Add-In Module User's Guide", v. 1.00 for Microsoft Excel V5.0, Power Measurement Ltd., Pgs. 1-55, Jan. 31, 1995.
Giles, David W. and Robert Lee, "M-SCADA Installation and Operation Manual", Version 3.0, Power Measurement Ltd., Aug. 15, 1991.
"Power Measurement 3720 ACM Data Sheet", Power Measurement Ltd., Pgs. 1-11, May 31, 1994.
"Power Measurement 3720 ACM Installation and Operation Manual", Power Measurement Ltd., Sep. 1, 1994.
"PEGASYS Vista User's Guide", Version 2.0, Power Measurement Ltd., Sep. 21, 1998.
"PEGASYS VIP User's Guide", Version 2.0, Power Measurement Ltd., Sep. 21, 1998.
"Modicon Ethernet to Modbus Plus Gateway User's Guide", GM-EMBP-001 Rev. A, MODICON, Inc., Dec. 1991.
"EPE5 Preliminary Installation and Programming Manual", Niobara Research and Development Corporation, Jun. 9, 1994.
"EPE5 Installation and Programming Manual", Niobara Research and Development Corporation, Jul. 8, 1994.
"EPE5 Ethernet Port Expander", Niobara Research and Development Corporation, Mar. 23, 1994.
"EPE5 Installation and Programming Manual", Niobara Research and Development Corporation, Jun. 12, 1995.
"MEB Installation and Programming Manual", Niobara Research and Development Corporation, Nov. 27, 1995.
LETTER dated Dec. 13, 2001 from Gustavo Siller to Charles O'Brien, with Attachment A.
FACSIMILE dated Aug. 4, 1994 from Bradford Forth to Elise Woolfort.
FACSIMILE dated Aug. 18, 1994 from Bradford Forth to John Bliven and Elise Woolfort.
FACSIMILE dated Oct. 7, 1994 from Bradford Forth to Elise Woolfort.

FACSIMILE dated Oct. 28, 1994 from Bradford Forth to Joseph Krisciunas.
FACSIMILE dated Nov. 3, 1994 from Bradford Forth to Elise Woolfort and Joseph Krisciunas.
FACSIMILE dated Feb. 2, 1995 from Bradford Forth to Bo Andersen.
LETTER dated Feb. 24, 1995 from Bradford Forth to Mr. Whitehead.
Sales Order No. 6501 dated Jul. 24, 2001.
FACSIMILE dated Mar. 24, 1995 from Bradford Forth to Don Whitehead.
FACSIMILE dated Apr. 12, 1995 from Bradford Forth to Don Whitehead.
MINUTES of Technical Meeting with GE dated May 15, 1995.
FACSIMILE dated Jun. 2, 1995 from Bradford Forth to Joseph Krisciunas, with Draft Attachment.
MEMO dated Jun. 22, 1995 from Jeff Mammen to Bradford Forth.
FACSIMILE/LETTER dated Sep. 15, 1995 from Veronica Kertesz to Piotr Przydatek.
FACSIMILE dated Sep. 19, 1995 from Bradford Forth to Veronica Curtez.
FACSIMILE dated Oct. 20, 1995 from Bradford Forth to Jack Brady.
MINUTES of Meeting with Bo Anderson, G.E., dated Feb. 1, 1996.
Sales Order No. 6234 dated Aug. 14, 2001.
Sales Order No. 9883 dated Aug. 14, 2001.
Sales Order No. 9979 dated Aug. 14, 2001.
Sales Order No. 10331 dated Aug. 14, 2001.
Sales Order No. 8580 dated Aug. 14, 2001.

* cited by examiner

VIRTUAL MODULAR RELAY DEVICE

CROSS REFERENCE TO RELATED APPLICATIONS

This Application is a continuation of U.S. application Ser. No. 09/397,395 filed Sep. 16, 1999 now abandoned entitled A VIRTUAL RELAY DEVICE, which is incorporated by reference in its entirety.

BACKGROUND OF THE INVENTION

The present invention relates generally to a power management control system and, in particular, to software that implements and automates the development of a virtual modular relay device.

Power management control systems allow an operator to monitor and control a variety of intelligent electronic devices within an electrical distribution system. Such devices can include relays, meters, switches, etc., which are generally mounted within a common switchgear cabinet to create a control panel. Modem power management control systems also include modular relay devices, such as General Electric Co.'s Universal Relay family of modular relay devices, mounted within the switchgear cabinet. A modular relay device allows the operator to monitor and control a group of devices in the distribution system. Modular relay devices can provide, for example, line current differential protection, distance protection, transformer management, feeder management, breaker management, and substation automation. Each modular relay device can monitor a number of system conditions, including current, voltage, and power quality, and current and voltage phasors. Modular relay devices are user-configurable, multi-function devices that include a plurality of interchangeable modules. These modules may be added or removed to meet the needs of the user. In sum, each modular relay device provides a customizable method of remotely monitoring and controlling the condition or status of a number of devices in the electrical system.

Some power management control systems include a computer connected to a common bus or network that allows communication between the intelligent electronic devices and the computer. The common bus or network may include a local-area-network, a wide-area-network, and/or the Internet. These so called computerized power management control systems allow a user to monitor and control the various intelligent electronic devices from a remote computer terminal. For these power management control systems, there is a need for a virtual (computer-simulated) intelligent electronic device to emulate the output and/or control interface of each of the intelligent electronic devices in the electrical distribution circuit. In other words, the user interface on the computer terminal must offer the same or similar outputs and controls as the actual intelligent electronic device, and the program running on the computer terminal must link the input and output signals to and from the actual intelligent electronic device with the virtual intelligent electronic device shown on the screen.

Modern computerized power management control systems offer a selection of pre-programmed virtual electronic devices that emulate a corresponding selection of actual intelligent electronic devices. Each actual intelligent electronic device has its own unique virtual intelligent electronic device. When configuring a computerized power management control system, the user simply selects the virtual device corresponding to the actual intelligent electronic device in his system. No programming is necessary to configure the computerized power management control system. Thus, the pre-programmed virtual electronic devices save a great deal of time and money in configuring the system. However, the functionality (i.e., the output and/or control functions) of such pre-programmed virtual electronic devices cannot be customized without re-programming the virtual device and incurring the time and money costs of such reprogramming. Fortunately, most intelligent electronic devices do not require such customization because they are not, themselves, customizable.

However, the use of pre-programmed virtual devices is problematic for a computerized power management control system including modular relay devices. As previously noted, modular relay devices can be customized to many configurations. In addition, modular relay devices are capable of outputting numerous readings, which can provide traffic to a communications network. Therefore, it is necessary for the user to create a customized virtual electronic device and incur the time and money costs of reprogramming.

BRIEF SUMMARY OF THE INVENTION

This invention offers advantages and alternatives over the prior art by providing an intelligent virtual modular relay device wizard for a power management control system that automates the development of a virtual modular relay device. The virtual modular relay device wizard comprises a generic, modular, configurable interface. The virtual modular relay device wizard allows the user to generate the virtual modular relay device without any programming skills or detailed device knowledge.

In accordance with a present invention, a method of generating a virtual modular relay device includes selecting a virtual modular relay device template, and initiating a utility for configuring a virtual modular relay device. Network identification data for an actual modular relay device is then entered. A first function to be provided by the virtual modular relay device is selected from a plurality of functions provided by the actual modular relay device.

BRIEF DESCRIPTION OF THE DRAWINGS

Referring now to the drawings wherein like elements are numbered alike in the several FIGURES.

DETAILED DESCRIPTION OF THE INVENTION

Figure 1:
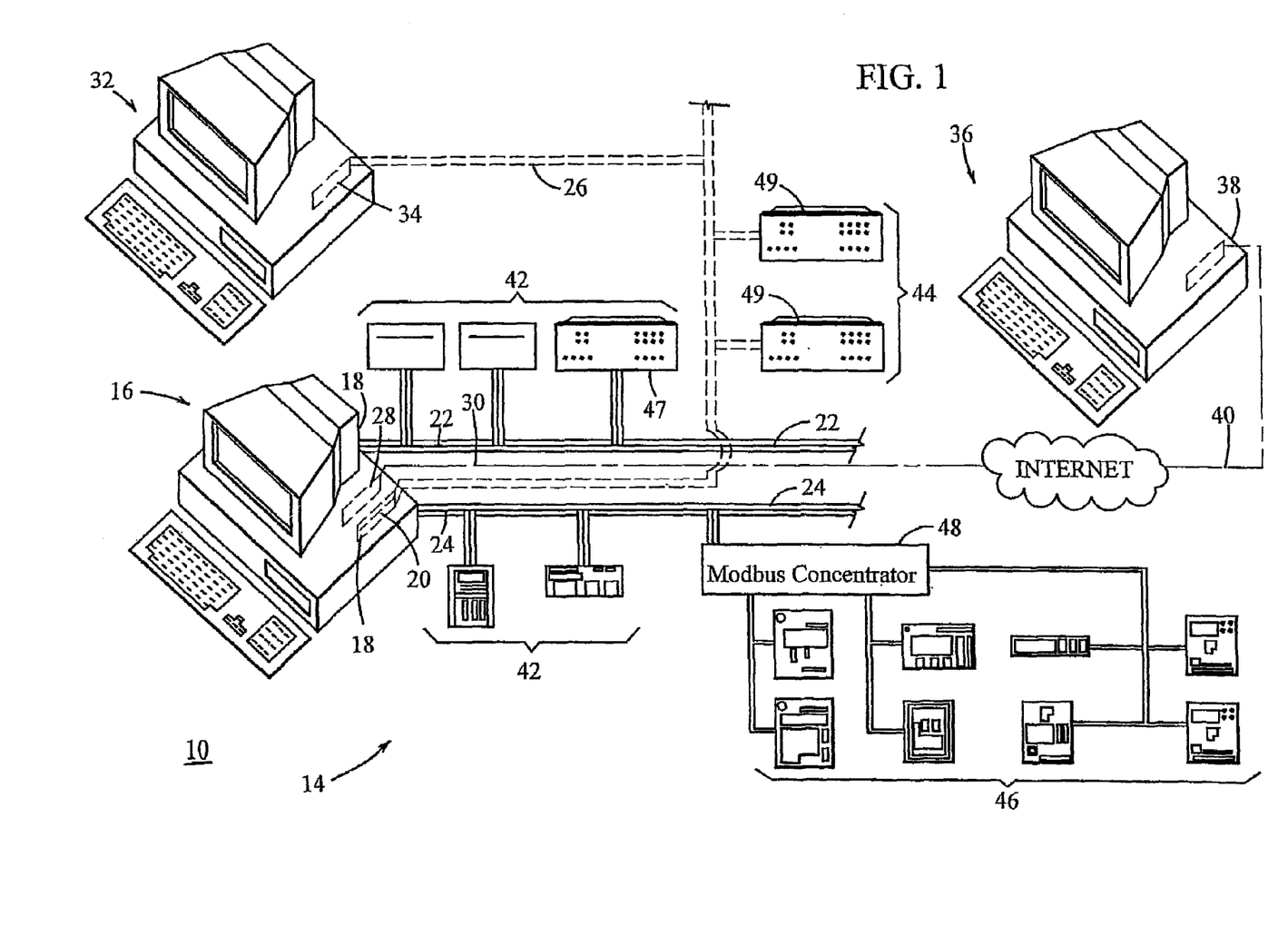
FIG. 1 is a diagrammatic block diagram of a computerized power management control system in accordance with the present invention.

Referring now to FIG. 1, a computerized power management control system ("PMCS"), generally designated 10, provides a three-dimensional ("3-D") virtual switchgear cabinet 12 (see FIG. 3) for displaying a visual indication of the status or condition of a plurality of intelligent electronic devices 14 of an electrical distribution system (not shown). The PMCS 10 comprises a server computer 16, e.g., an IBM-PC AT compatible machine which is based on a Pentium processor, having network interface cards 18 and 20 installed in its I/O slots. The server computer 16 contains software for monitoring and controlling selected aspects of power usage/consumption, as described in more detail hereinafter. Network interface cards 18 and 20 comprise standard RS485 and Ethernet interface cards, respectively. RS485 interface cards 18 provide I/O ports that form part of industry standard ModBus RTU networks 22 and 24. Ethernet card 20 provides an I/O port that forms part of a 10BaseF or redundant 10BaseF Ethernet network 26. Alternatively, network 26 supports either the ModBus TCP/IP, or MMS/UCA2 (Utilities Communications Architecture 2.0) protocols, and interface card 20 comprises a standard RS485 I/O port. The ModBus RTU, Ethernet, ModBus TCP/IP, and MMS/UCA2 protocols are well-known industry standards. A modem 28 is connected to an I/O port of computer 18, and connects to a telephone line 30 for TCP/IP communication over the Internet.

Computerized power management control system 10 further includes a local client computer 32 having an Ethernet (or RS485) interface card 34 with an I/O port forming part of network 26. Local client computer 32, e.g., an IBM-PC AT compatible machine which is based on a Pentium processor, contains software for monitoring and controlling selected aspects of power usage/consumption, as described in more detail hereinafter.

Computerized power management system 10 further includes a remote client computer 36 having a modem 38 that connects to the Internet via a telephone line 40, and to server computer 16 via an Internet connection. Remote client computer 36, e.g., an IBM-PC AT compatible machine which is based on a Pentium processor, contains software for monitoring and controlling selected aspects of power usage/consumption, as described in more detail hereinafter.

Intelligent electronic devices 14 include a first group of intelligent electronic devices 42 that can be connected directly to either of the ModBus networks 22 or 24, a second group of intelligent electronic devices 44 that can be connected directly to the Ethernet (or TCP/IP or MMS/UCA2) network 26, and a third group of electronic devices 46 that require a ModBus concentrator 48 to connect to either of the ModBus networks 22 or 24. Each device in the first group 42 has a ModBus RTU interface, which can be connected directly to ModBus networks 22 or 24. Included in the first group are, for example, control devices, such as, General Electric Multilin models 269 and 565 and power management EPM 3710 and EPM 3720. Also included in first group 42 are, modular relays 47, such as the General Electric Universal Relay family of modular relays. Each device in the second group of intelligent electronic devices 44 has an Ethernet (or TCP/IP or MMS/UCA2) interface, which can be connected directly to the Ethernet (or TCP/IP or MMS/UCA2) network 26. The second group 44 includes, modular relays 49, such as the General Electric Universal Relay family of modular relays. The third group of intelligent electronic devices 46 includes, for example, trip units, e.g., Trip, Enhanced Trip-D, Trip PM and Enhanced Trip-C Units commercially available from General Electric Co., meters, e.g., power Leader Meters commercially available from General Electric Co., and relays, e.g., General Electric Co.'s Spectra ECM and Power Leader MDP. ModBus concentrator 48 provides an interface between the ModBus RTU protocol and the Commnet protocol used by the third group 48, whereby the devices of the third group 48 can communicate through ModBus concentrator over the ModBus networks 22 and 24. In this example, up to thirty-two devices (i.e., direct connect devices or ModBus concentrators) can be connected to each ModBus RTU network 22 and 24.

Figure 3:
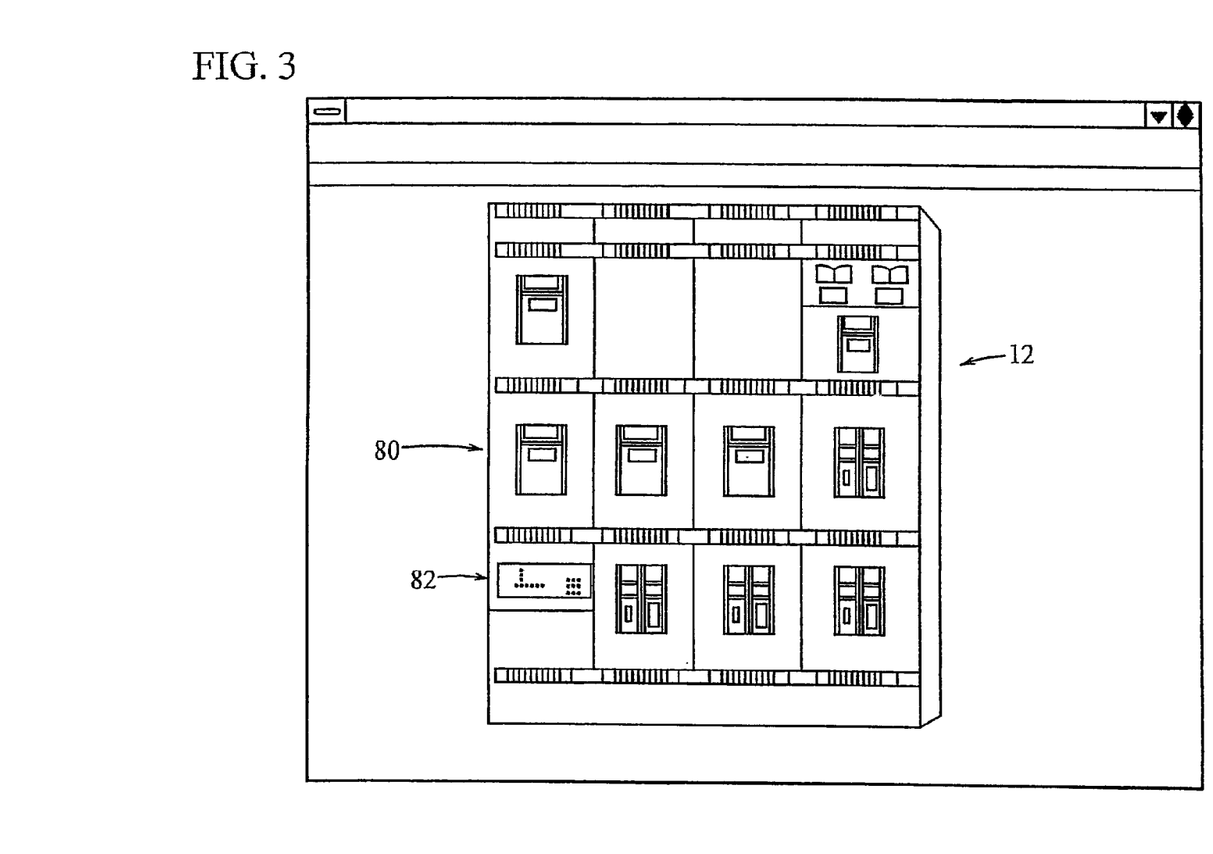
FIG. 3 is view of a window containing a configured virtual switchgear cabinet generated by the computer software of FIG. 2.

Referring now to FIG. 3, a block diagram 50 of the software for monitoring and controlling selected aspects of power usage/consumption of the PMCS 10, discussed above, is generally shown. This software is loaded into the client and server computers 16, 32, and 36, as described in more detail hereinafter.

Figure 2:
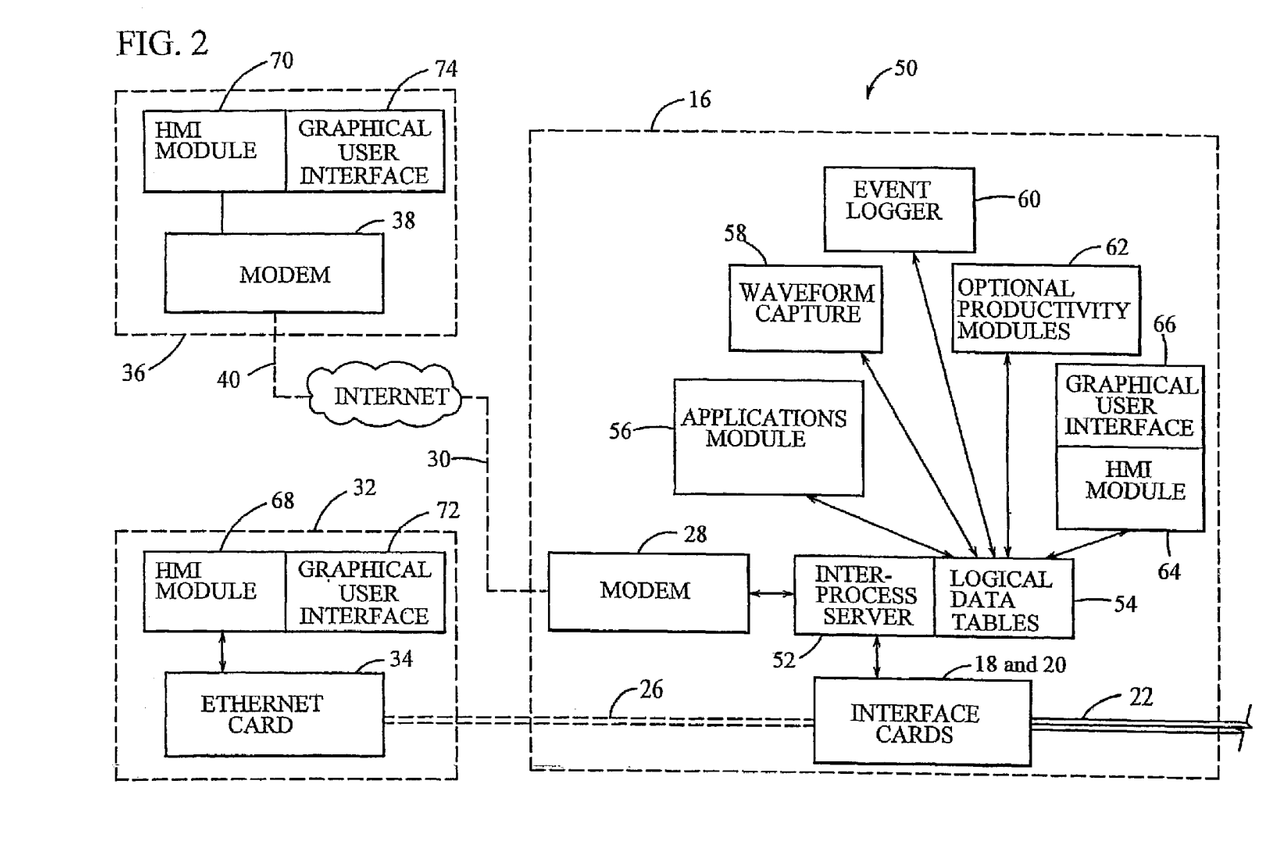
FIG. 2 is a block diagram of the computer software used in the computerized power management control system of the present invention.

Loaded into server computer 16 is an inter-process communication server 52, e.g., a DDE (Dynamic Data Exchange) or OPC (Object Linking and Embedding for Process Control) server. Inter-process server 52 allows external programs to access power management data in a Microsoft Windows environment. Inter-process server 52 is provided by the system through a utility in a Human-Machine Interface (HMI) package. A configuration and control interface for the inter-process server is provided through server application window menus (not shown). Associated with inter-process server 52 are logical data tables 54 and related modules, i.e., an Excel or other process-aware applications module 56, a waveform capture module 58, an event logger module 60, productivity modules 62, and a HMI module 64. Module 64 includes a tool kit for building screens and interfaces, and a graphical user interface 66 for monitoring and control of the electrical distribution system. The graphical user interface 66 for the server operates in 32-bit Windows or Windows NT environment using Windows and HMI library functions. Waveform capture module 58 provides for viewing and analysis of waveforms (e.g., Fourier, frequency and/or harmonic analysis) captured by sophisticated metering devices (e.g. modular relays 47 and 49 of FIG. 1). Event Logger module 60 provides for viewing, organizing and analyzing unusual behavior in a power system. Productivity modules 62 include, for example, a cost allocation module and a load management module. The cost allocation module provides for tracking power consumption to the sub-unit level, developing internal billing methods and reports, thereby reducing cost. The load management module provides for tracking power demand and automatically shedding non-critical loads to prevent peak demand penalties, and provides for timer-based control to reduce power consumption. Inter-process server 52 communicates though networks 22 (or 24) and 26 via the interface cards 18 and 20, and through telephone line 30 via modem 28.

Loaded into local and remote client computers 32 and 36 are modules 68 and 70, respectively. HMI modules 68 and 70 each include a tool kit for building screens and interfaces, and a graphical user interface 72 and 74, respectively, for monitoring and control of the electrical distribution system. Alternatively, modules 68 and 70 could comprise ActiveX controls designed to allow the remote monitoring and control of the electrical distribution system. Module 68 communicates with inter-process server 52 using an inter-process communication protocol, such as DDE or OPC/DCOM, via Ethernet card 34 and Ethernet network 26. Similarly, module 70 communicates with inter-process server 52 using an inter-process communication protocol, such as DDE or OPC/DCOM, via modem 38, phone lines 40 and 30, and the Internet.

The HMI modules 64, 68, and 70 include a software toolkit for rapid development of a virtual switchgear cabinet 12, as shown in FIG. 3. As in an actual switchgear cabinet, the virtual switchgear cabinet 12 contains a plurality of virtual intelligent electronic devices 80. These virtual intelligent electronic devices 80 have logical connections to their corresponding intelligent electronic devices 14 shown in FIG. 1. Device 82 represents a virtual modular relay device. A typical virtual switchgear cabinet 12 can be modified to any dimensions with an infinite number of combinations and arrangements of intelligent electronic devices 80 to quickly and accurately represent a customer's switchgear.

Figure 4:
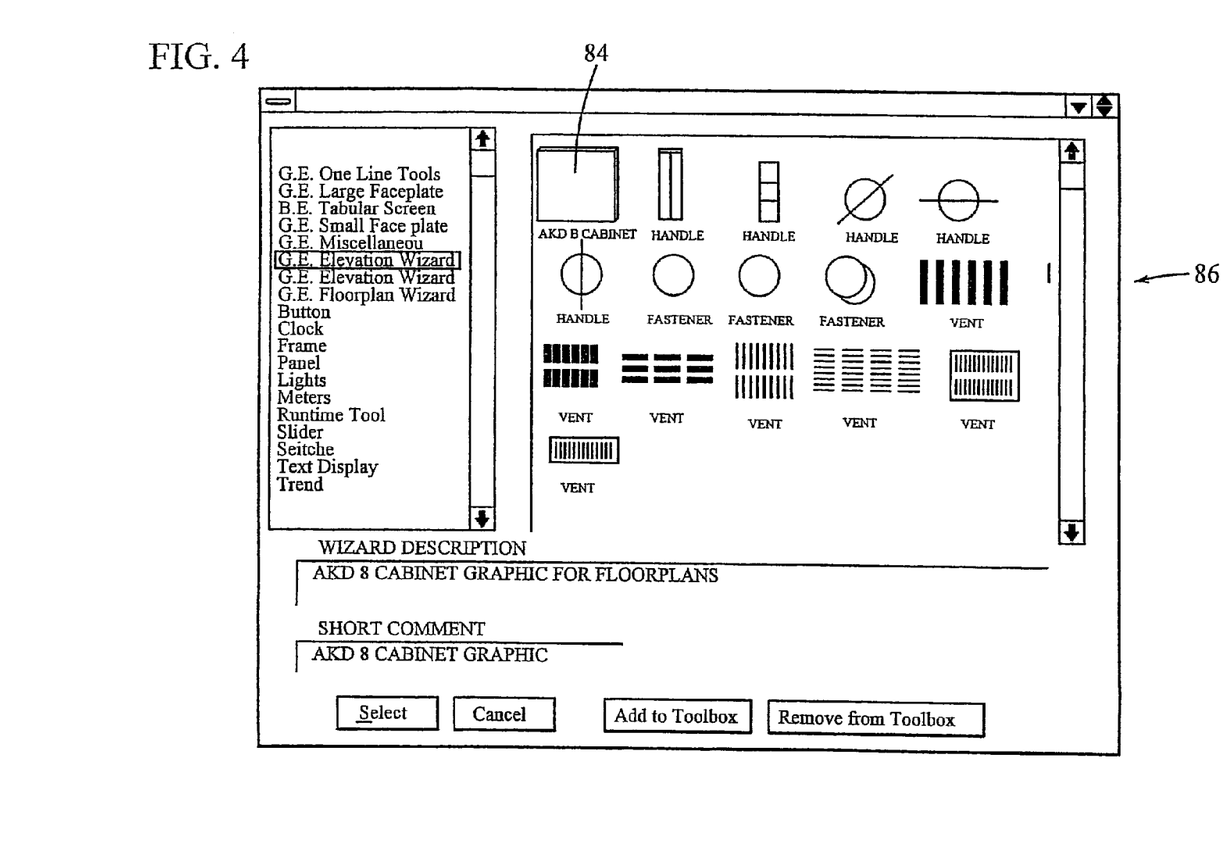
FIGS. 4–5 are views of wizard selection dialog box windows generated by the computer software of FIG. 2.
Figure 5:
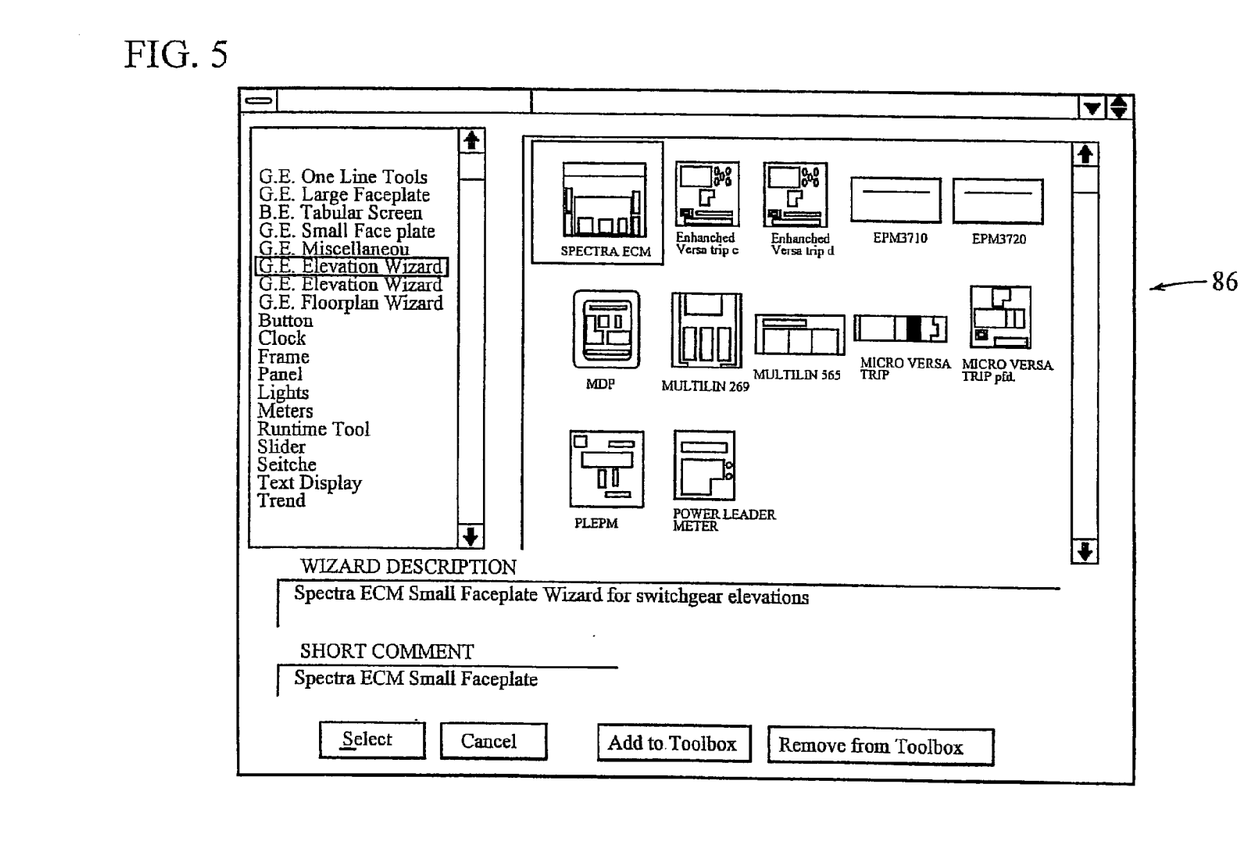

Referring to FIGS. 3, 4, and 5, virtual switchgear cabinet 12 and virtual intelligent electronic devices 80 are configured by the user using utilities within the software that guide the user through the process of configuring the devices. Such utilities are commonly known as "wizards". The user starts by selecting a cabinet template such as the AKD-8 or power Break Cabinet 84 from a template selection dialog box 86, such as that shown in FIG. 4. Thereafter, the user selects individual templates for each intelligent electronic device 80 from another template selection dialog box 86, such as that shown in FIG. 5. As can be seen in FIGS. 3–5, the template for a particular cabinet or device is represented by a graphical depiction of the actual cabinet or device. The user locates or drops the template for each virtual intelligent electronic device 80 onto the virtual switchgear cabinet 12 in the same locations as their corresponding actual intelligent electronic device in the customer's actual switchgear. The result is a virtual switchgear cabinet 12 that looks the same as the user's actual switchgear cabinet.

After the template for each virtual intelligent electronic device 80 has been positioned in the virtual switchgear cabinet, the user double clicks on each virtual intelligent electronic device 80, initiating the utility (wizard) for configuring the devices. The user is then presented with a series of dialog boxes in which the user can enter information identifying the virtual intelligent electronic device and its actual counterpart. The utility automatically links the virtual intelligent electronic device 80 to its actual counterpart (14 of FIG. 1) so that input and output signals may be sent between the two.

Referring to FIGS. 1,2,3, and 6, FIG. 6 shows a view of a window 90 containing an un-configured virtual modular relay device 82, as would appear when the template for the virtual modular relay device 82 is first double-clicked. The upper left-hand corner of window 90 includes a graphical depiction 92 of the virtual modular relay device 82. Immediately below the graphical depiction is a communications status indicator 94, which shows "communications failed". Communications status indicator 94 shows the status of communications (connected/disconnected) between the virtual device 82 and the inter-process server 52. Various identification fields 96 appear along the left-hand side of window. Below identification fields 96 are a plurality of buttons 98. To the right of buttons 98, extending along the bottom of window 90, are tabs 100. Located above tabs 100 is a function page 102.

Figure 6:
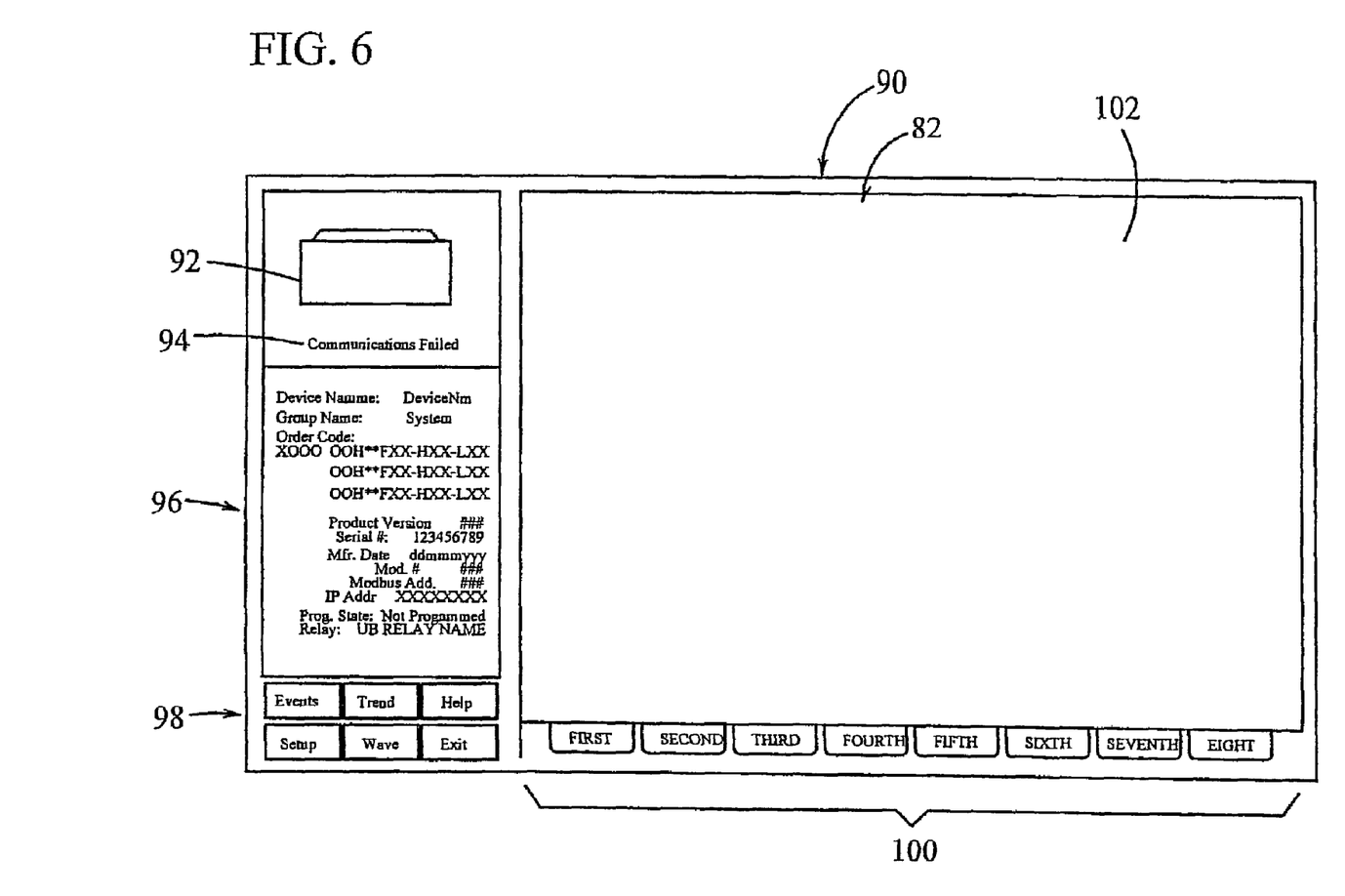
FIG. 6 is a view of a window containing an un-configured virtual modular relay device generated by the computer software of FIG. 2.
Figure 7:
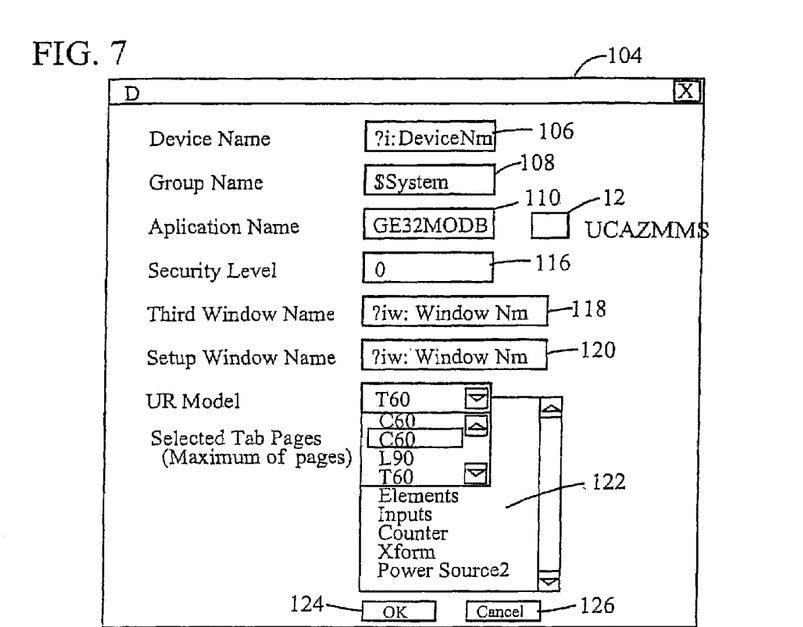
FIG. 7 is a view of a modeless dialog box containing the configuration data for a virtual modular relay device generated by the computer software of FIG. 2.

Referring to FIGS. 1, 2, 6 and 7 when the user selects to configure the virtual modular relay device 82, a modeless dialog box 104 for inputting configuration data appears, as is shown in FIG. 7. Dialog box 104 includes a number of fields in which the user enters identification data for the modular relay device. "Device Name" field 106 accepts the unique network identification name for the actual modular relay device 47 or 49. "Group Name" field 108 accepts the network identification name of a group of intelligent electronic devices of which the device identified in the "Device Name" field is a part. "Application Name" field 110 accepts the network identification name of the inter-process server 52. Fields 106, 108 and 110 provide the input necessary to identify the actual intelligent device 47 or 49 to which the virtual intelligent device 82 is to be linked. To the right of the "Application Name" field 110 is a check box 112 entitled "UCA/MMS". Check box 112 allows the user to specify the communication protocol used on the network between the virtual modular relay device 82 and the inter-process server 52. In the embodiment shown, the ModBus protocol is default, while UCA/MMS can be selected. Fields 106, 108 and 110 along with check box 112 allow the virtual modular relay device 82 to be configured for installation on the server computer 18, on the local client computer 32, or on the remote client computer 36.

"Security Level" field 114 allows the user who is configuring the virtual device 82 to set the security clearance level required to remotely operate the actual device 47 or 49 via the virtual device 82. The default level is "0", with higher numbers requiring a greater level of clearance. For example, if the security level is set at "4", an authorized user with a clearance of "5" could remotely manipulate the actual device 47 or 49, while an unauthorized user with a clearance of "2" could not. The unauthorized user could, however, passively view the data output to the virtual device 82.

"Trend Window" and "Setup Window" fields 116 and 118 allow the user to input network identification names of modules or processes to be initiated when "Trend" or "Setup" buttons, included in the plurality of buttons 98, are selected. For example, the network identification names input into either of these fields may identify optional productivity module 62 or applications module 56 shown in FIG. 2.

"UR Model" drop-down list 120 allows the user to select the appropriate model of modular relay. The drop-down list 120 shown includes the various models in General Electric Co.'s Universal Relay (UR) family of modular relays.

Beneath the "UR Window" drop-down list 120 is a scrolling list 122 of "Selected Tab pages". The items listed in scrolling list 122 correspond to the functions offered by the model of Universal Relay selected in drop-down list 120. The user can select a number of these items, which correspond to a number of tabs 100 on window 90. Each of the items represents a particular function of the actual modular relay 47 of 49. The items selected will be available in window 90.

At the bottom of dialog box 104 are "OK" and "CANCEL" buttons 124 and 126. Selecting the "OK" button 124 causes the utility (wizard) to accept the configuration data, close dialog box 104, complete virtual modular relay 82 functionality in the HMI Application, and establish the appropriate database server links. Selecting the "CANCEL" button 126 causes the program to ignore changes to the configuration data and closes the dialog box 104.

Referring to FIGS. 1, 2, 6, 7, and 8, FIG. 8 shows a window 90 containing a configured virtual modular relay device 82. "Device Name" and "Group Name" fields 130 and 132 display the device name and group name input into their respective fields 106 and 108 in dialog box 104. "Order Code", "Product Version", "Serial #", "Mfr Date", and "Model Number" fields 134, 136, 138, 140, and 142 display purchasing information to identify the actual modular relay device 47 or 49. These fields allow the user to quickly identify the modular relay device. Input for fields 134, 136, 138, 140, and 142 is provided by a signal from the actual relay device 47 or 49. "Modbus Addr" and "IP Addr" fields provide the ModBus address or IP address of the server computer 16.

Figure 8:
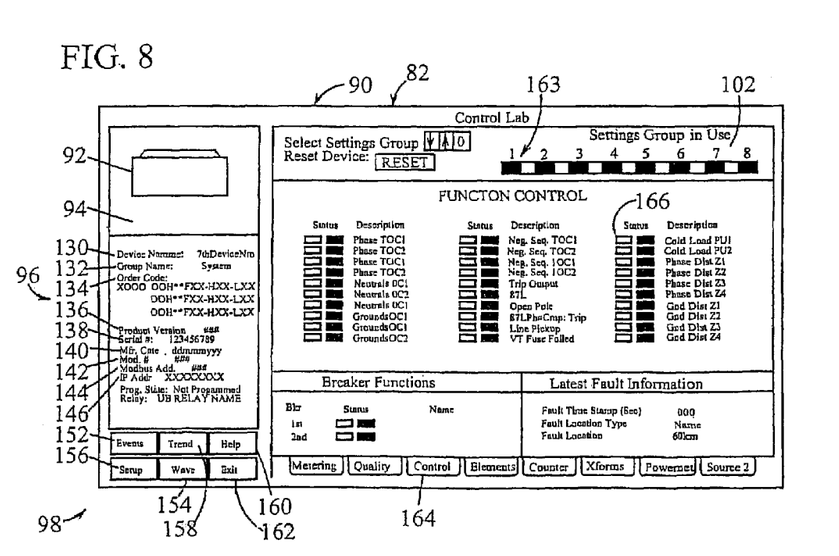
FIG. 8 is a view of a window containing a configured virtual modular relay device generated by the computer software of FIG. 2.

Buttons 98 include the "Events" and "Wave" buttons 152 and 154 that initiate the event logger module 60 and waveform capture module 50, respectively, when selected. "Setup" and "Trend" buttons 156 and 158 initiate the modules or processes identified in input fields 116 and 118 of dialogue box 104. Thus, buttons 152, 154, 156 and 158 allow the user to have quick access to various modules and custom features. Clicking on "Help" button 160 calls an on-line help directory that provides information to the user. "Exit" button 162 closes window.

Located at the bottom of window 90 are tabs 100. Each title shown on tabs 100 (e.g., "Metering", "Quality", "Control") represents a function selected in scrolling list 122 of dialogue box 104. Each tabbed function page 102 represents a function of the actual modular relay 47 or 49. The number of tabbed function pages 102 available to the user is set by the number of functions selected in scrolling list 122. Within each tabbed page 102 is a plurality of tags 163. Each tag 163 is mapped to a register in the actual modular relay device 47 or 49, and sends data to, and receives data from, the register. The number of tags 163 to be mapped is determined by the functions that the user chooses in scrolling list 122. Thus, the user can limit the number of tags used to the number that are needed.

To view a particular function, the user simply selects a tab 100. Once the tab 100 is selected, the tags 163 for that function (e.g., the indicator lights, buttons, data displays, etc.) appear in a graphic on page 102. For example, FIG. 8 shows the features of the "Control" function of a modular relay, as would be displayed when the "Control" tab 164 is clicked on. The "Control" function allows the operator to view the status of individual breakers controlled by the modular relay 47 or 49, and to operate these breakers by clicking on tags 163, shown as buttons 166. Tabs 100 allow the user to quickly view numerous functions, and arrange numerous tags 163 without cluttering the computer screen.

As previously noted, modular relay devices 47 or 49 can be customized to many configurations and are capable of outputting numerous readings, which can provide traffic to a communications network. The virtual modular relay device 82 provides the user with a generic device that can be customized to meet the requirements of its accompanying modular relay device 47 or 49. Identification fields 106, 108, and 110, and check box 112 allow the user to configure the virtual modular relay 82 to be used on server, local client, and remote client computers 16, 32, or 36. Drop-down list 120 allows the user to configure the virtual modular relay 82 to a number of different models. Scrolling list 122 allows the user to select the functionality that is important for a particular application. Moreover, the virtual modular relay device utility allows the user to generate the virtual modular relay device 82 without any programming skills.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of generating a virtual modular relay device for a computerized power management control system having an actual modular relay device, the method comprising:

selecting a virtual modular relay device template;
initiating a utility for configuring a virtual modular relay device;
selecting a communication protocol type indicative of a communication protocol used on a network between said virtual modular relay device and an inter-process communications server and entering network identification data for an actual modular relay device, thereby allowing said virtual modular relay device to be configured for installation on a server computer, a local client computer, and a remote client computer;
selecting a first function to be provided by said virtual modular relay device representative of one of a plurality of functions provided by said actual modular relay device; and
providing a first number of tags required by said first function mapped to a first number of registers in said actual modular relay device;
wherein said selecting a first function allows said virtual modular relay device to be configurable and said actual modular relay device to be generic.

2. The method of claim 1 further comprising:
selecting a model of modular relay device from a list including a plurality of models of modular relay devices.

3. The method of claim 1 further comprising:
displaying a first graphic indicative of said first function on a second graphic indicative of a tabbed page;
selecting a second function to be provided by said virtual modular relay device representative of another of said plurality of functions provided by said actual modular relay device;
providing a second number of tags required by said second function mapped to a second number of registers in said actual modular relay device; and
displaying a third graphic indicative of said second function on a fourth graphic indicative of another tabbed page.

4. The method of claim 1 wherein said entering network identification data for an actual modular relay device includes:
entering a group identification name, said group identification name identifying a group of intelligent electronic devices including said actual modular relay device.

5. The method of claim 1 further comprising:
assigning a security access level value to said first function, whereby a user assigned a security access level of at least said panel security access level value may reset a condition of said first function.

6. The method of claim 1 further comprising:
displaying a button; and
assigning a program module to said button for activating said program module when said button is selected.

7. The method of claim 6 wherein said initiating a utility for configuring a virtual modular relay device is accomplished by clicking on said virtual modular relay device template.

8. The method of claim 1 further comprising:
displaying a help button for invoking a help file that provides a user information on the features and operation of said virtual modular relay device.

9. The method of claim 1 further comprising:
displaying a graphic indicative of a communication statue between said virtual modular relay device and an inter-process communications server.

10. The method of claim 1 further comprising:
displaying information for identifying said actual modular relay device, said information being provided by a signal from said actual modular relay device.

11. A method of generating a virtual modular relay device for a computerized power management control system having an modular relay device, the method comprising:
selecting a virtual modular relay device template;
initiating a utility for configuring a virtual modular relay device;
selecting a communication protocol type indicative of a communication protocol used on a network between said virtual modular relay device and an inter-process communications server and entering network identification data for an actual modular relay device, thereby allowing said virtual modular relay device to be configured for installation on a server computer, a local client computer, and a remote client computer;
selecting a model of modular relay device from a list including a plurality of models of modular relay devices;
providing a list of a plurality of functions provided by said model of modular relay device;
selecting a function to be provided by said virtual modular relay device representative of one of said plurality of functions provided by said model of modular relay device; and
providing a number of tags required by said function mapped to a number of registers in said actual modular relay device.

12. A method of generating a virtual modular relay device for a computerized power management control system having an actual modular relay device, the method comprising:
selecting an un-configured virtual modular relay device by activating an associated virtual modular relay device template;
initiating a utility for configuring the un-configured virtual modular relay device;
entering network identification data for an actual modular relay device;
selecting a first function to be provided by said virtual modular relay device representative of one of a plurality of functions provided by said actual modular relay device; and
providing a first number of tags required by said first function mapped to a first number of registers in said actual modular relay device;
wherein said selecting a first function allows said virtual modular relay device to be configurable and said actual modular relay device to be generic.

* * * * *

UNITED STATES PATENT AND TRADEMARK OFFICE
CERTIFICATE OF CORRECTION

PATENT NO. : 7,047,274 B2 Page 1 of 1
APPLICATION NO. : 10/195866
DATED : May 16, 2006
INVENTOR(S) : Robert P. Thomas et al.

It is certified that error appears in the above-identified patent and that said Letters Patent is hereby corrected as shown below:

Claim 9, Column 8,
Line 65, after "communication", delete "statue" and insert therefor --status--.

Claim 11, Column 9,
Line 7, after "an", insert --actual--.

Signed and Sealed this

Twenty-seventh Day of February, 2007

JON W. DUDAS
*Director of the United States Patent and Trademark Office*